(12) United States Patent
Mader

(10) Patent No.: US 10,633,200 B2
(45) Date of Patent: Apr. 28, 2020

(54) SEALING AND DE-STACKING

(71) Applicant: LISEC AUSTRIA GMBH, Seitenstetten (AT)

(72) Inventor: Leopold Mader, Neuhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 316 days.

(21) Appl. No.: 15/395,636

(22) Filed: Dec. 30, 2016

(65) Prior Publication Data

US 2017/0107754 A1 Apr. 20, 2017

Related U.S. Application Data

(62) Division of application No. 14/350,472, filed as application No. PCT/AT2012/000265 on Oct. 22, 2012, now abandoned.

(30) Foreign Application Priority Data

Oct. 20, 2011 (AT) .................. A 1541/2011

(51) Int. Cl.
*E06B 3/673* (2006.01)
*B65G 57/00* (2006.01)
(Continued)

(52) U.S. Cl.
CPC .......... *B65G 57/005* (2013.01); *A47F 7/0042* (2013.01); *B25J 15/0616* (2013.01);
(Continued)

(58) Field of Classification Search
CPC ............. E06B 3/67365; E06B 3/67382; B65G 57/005
See application file for complete search history.

(56) References Cited

U.S. PATENT DOCUMENTS 4,422,541 A 12/1983 Lisec
4,559,001 A 12/1985 Wiedenhofer et al.
(Continued)

FOREIGN PATENT DOCUMENTS

AT 384 596 B 12/1983
DE 28 34 902 A2 2/1980
(Continued)

OTHER PUBLICATIONS

International Search Report, dated May 28, 2013, from corresponding PCT application.
(Continued)

*Primary Examiner* — Philip C Tucker
*Assistant Examiner* — John Blades
(74) *Attorney, Agent, or Firm* — Young & Thompson

(57) ABSTRACT

When being sealed, insulating glass blanks (5) are held in a sealing station (2) gripped at the base by grippers (17) of a gripper arrangement (16) and/or by suction heads (15) and rest at the top against a roller beam (7) fitted with rollers (8). As the insulating glass blank (5) is sealed, only the nozzle (11) of a sealing assembly (10) moves along the outer edge of the insulating glass blank (5), which is stationary during the sealing process. When the lower edge of an insulating glass blank (5) is sealed, grippers (17) engaging the lower edge are released and move away downwards. Sealed insulating glass is removed from the sealing station (2) by a removal robot (24) onto the side opposite the sealing assembly (10), moved to a temporary store and placed therein on A-bearing supports (29) and fan frames (30) sorted according to production lots.

8 Claims, 5 Drawing Sheets

(51) Int. Cl.
  *B65G 49/06* (2006.01)
  *A47F 7/00* (2006.01)
  *B25J 15/06* (2006.01)

(52) U.S. Cl.
  CPC ......... *B65G 49/067* (2013.01); *B65G 49/068* (2013.01); *E06B 3/67326* (2013.01); *E06B 3/67347* (2013.01); *E06B 3/67365* (2013.01); *E06B 3/67382* (2013.01); *E06B 3/67386* (2013.01); *E06B 3/67391* (2013.01); *B65G 2249/04* (2013.01); *E06B 2003/67378* (2013.01)

(56) References Cited

U.S. PATENT DOCUMENTS

| | | | |
|---|---|---|---|
| 5,332,080 A | * | 7/1994 | Lenhardt ............ E06B 3/67365 156/107 |
| 5,906,282 A | | 5/1999 | Aldrich et al. |
| 2004/0240972 A1 | * | 12/2004 | Mori .................... B65G 49/061 414/222.01 |
| 2006/0123850 A1 | | 6/2006 | Demars et al. |
| 2010/0303600 A1 | | 12/2010 | Franz |
| 2012/0207575 A1 | | 8/2012 | Masoero et al. |

FOREIGN PATENT DOCUMENTS

| | | | | |
|---|---|---|---|---|
| DE | 3 400 031 C1 | | 4/1985 | |
| DE | 34 08 688 A1 | | 6/1985 | |
| DE | 3345940 | * | 6/1985 | ........... B65G 49/063 |
| DE | 102 10 558 A1 | | 9/2003 | |
| EP | 0 122 405 A2 | | 10/1984 | |
| EP | 0 857 848 A2 | | 8/1998 | |
| EP | 1 698 575 A1 | | 9/2006 | |
| EP | 1 733 909 A2 | | 12/2006 | |
| EP | 2 301 868 A1 | | 3/2011 | |
| FR | 2 849 795 A1 | | 7/2004 | |
| JP | 2003-212340 | * | 7/2003 | ........... B65G 49/06 |
| WO | 2008/135032 A1 | | 11/2008 | |
| WO | 2011/015610 A1 | | 2/2011 | |

OTHER PUBLICATIONS

AT Office Action, dated Oct. 20, 2011, from corresponding AT application.

* cited by examiner

SEALING AND DE-STACKING

BACKGROUND OF THE INVENTION

Field of the Invention

The invention relates to a method and a device for sealing insulating glass blanks during the course of the production of insulating glass, and a method and an arrangement for de-stacking sealed insulating glass.

Description of the Related Art

It is known, and during the production of insulating glass it is common, to fill the edge seam of insulating glass blanks, open toward the outside and resting between the glass panes outside of the spacers and consisting of at least two glass panes with a spacer inserted in-between, which spacer is connected to the glass panes, with sealing compound in order to achieve the final bond of the glass panes of the insulating glass. For sealing insulating glass blanks, various proposals relative to method and device have been made. In particular, it is problematic to transport insulating glass panes during and after sealing since until it has hardened, sealing compound is very sticky and clogs transport means, which engage the (lower) edge of the insulating glass panes. In order to solve this problem, various proposals for special designs of conveying means have been made (cf., e.g., AT 384 596 B, EP 0 122 405 A, EP 0 857 848 A, and DE 34 00 031 C).

Although the known methods and devices have proven their worth to a very great extent, a need exists for an improved method for sealing and for de-stacking freshly-sealed insulating glass panes on bearing supports, which has often been problematic, and for devices for this purpose.

BRIEF SUMMARY OF THE INVENTION

The object of the invention is based on improving the sealing and the de-stacking, whereby the circumstance that fresh sealing compound is sticky is to be taken into account.

This object is achieved according to the invention with methods that have the features of the independent claims.

Insofar as the devices according to the invention are concerned, the above-mentioned object is achieved with devices that have the features of the independent claims, oriented to the devices.

Preferred and advantageous configurations of the invention, both as far as the method and also the devices are concerned, are subjects of the subclaims.

Since, in the invention, after an insulating glass blank is hauled into the sealing station, the conveying means, such as for example, rollers, are replaced by holding elements and/or support elements, and the insulating glass blank is held, for example, by a suction device engaging its side opposite the sealing assembly (sealing nozzle with drive thereof) and/or by a gripper assembly engaging, in particular clamping, the lower edge of the insulating glass blank, the edge of the insulating glass blank is freely accessible for carrying out the sealing process. In this case, in the case of the device according to the invention, the procedure can be performed with a so-called one-nozzle sealing machine, i.e., with a nozzle that travels around the entire periphery of the insulating glass blank that is to be sealed. When the lower, horizontal edge of the insulating glass blank is sealed, if need be support elements (grippers) engaging the lower edge move away from the insulating glass blank, so that the nozzle can move along the lower edge of the insulating glass blank. As soon as the sealing is completed, the insulating glass pane is removed from the sealing station by a removal robot, which is fitted, for example, with suction devices, and de-stacked, whereby a de-stacking of insulating glass is possible according to various criteria.

Opposite to the usual movement of insulating glass blanks during sealing of the horizontal sections of the edge seams that are to be filled, it is preferably provided in the invention that during sealing, the insulating glass blank is not moved (run back and forth horizontally).

In one embodiment of the invention, it is provided that the insulating glass blank, while it is sealed, rests against a roller beam with its upper edge opposite the lower transport means. This roller beam is fitted with a series of rollers that can rotate freely around essentially vertical shafts, and it can be shifted up and down in the sealing station parallel to the plane of the insulating glass blank, so that on the one hand, it is oriented toward the upper edge of the insulating glass blank, and on the other hand, it can be moved away from the area of the sealed insulating glass blank, so that the sealed insulating glass can be removed by the robot and de-stacked. Just like suction devices engaging the lower edge of the insulating glass blank, the roller beam is arranged on the side opposite the sealing assembly (one or two sealing nozzles, which are mounted on a slot that can be shifted). The roller beam is oriented in particular at a distance from the upper edge (below the same) of the insulating glass blank so that the upper edge of the insulating glass blank is accessible for sealing.

In one embodiment of the invention, it is provided that the transport means, such as conveyor belts, chain pulls (AT 384 596 B), or rollers of the lower conveying means (supply conveyors), are moved away from their operative position, e.g., folded down, after the insulating glass blank is held by grippers (support fingers) and/or suction devices engaging the lower edge.

In principle, within the framework of the invention, embodiments are also taken into consideration in which the insulating glass blank is held on its lower edge either only by grippers or support fingers or only by suction devices, while it is being sealed.

Within the framework of the invention, during sealing, it is also taken into consideration to hold the insulating glass blank from the bottom only by the gripper assembly or only by the suction devices and from the top only by the roller beam.

Not withstanding the above, the insulating glass blank can be held from the bottom both by the suction devices and by the gripper assembly, while it is being sealed.

For example, within the framework of the invention, consideration is given to depositing insulating glass, sorted according to production lots, in the intermediate storage unit—comprising bearing supports/compartment racks—which is assigned to the sealing station, i.e., to temporarily store insulating glass collectively, which has, for example, the same dimensions (dimensions of glass panes and/or dimensions of the spacers between the glass panes). In order to compile order lots, insulating glass is removed from the intermediate storage unit with the production lots.

For example, in an embodiment of the invention, it is provided that the insulating glass blanks that are sealed in the sealing station are moved to the intermediate storage unit by means of a removal robot that is fitted, for example, with a suction device panel. In this case, the removal robot can have a suction device panel that is movable on a beam that is oriented either parallel to the conveying direction from the insulating glass blanks into the sealing station or crosswise to this conveying direction.

The intermediate storage unit can have, for example, at least two groups of supports for insulating glass. For example, so-called A-bearing supports and, in addition, compartment racks are provided. In this case, it is provided in particular that during de-stacking, insulating glass with identical spacers are deposited on A-bearing supports, and insulating glass with spacers with different widths is deposited in at least one compartment rack ("production lots").

In order to compile order lots, depending on the order, insulating glass is then removed from A-bearing supports and from compartment racks. When sealing insulating glass blanks, this working method allows sealing to be done with different dimensions (length×width) but identically wide spacers, so that repositioning work is avoided. Only when a larger amount of insulating glass blanks with spacers of different widths are to be sealed is the repositioning work done.

In one embodiment of the invention, it is provided that the compartment supports or compartment frames have support elements for insulating glass that are designed in the shape of a V so that the glass panes of freshly-sealed insulating glass are placed or rest on the support elements only with the outer edges of their pane edges.

In order to facilitate the removal of insulating glass from the compartment rack by means of removal and replacement robots fitted with suction heads, it can be provided that the compartments can be widened by shifting compartment margins, or not every compartment is coated with insulating glass—e.g., only every other compartment.

During sealing, the grippers engaging the lower edge of insulating glass blanks are designed, for example, so that they engage only one or two glass panes of the insulating glass blank, whereby even the sealing of stage elements is possible. In this case, it is preferred when the jaws of the grippers clamping the insulating glass blank engage the glass panes only in the area of the outer edges of the pane edges.

The intermediate storage unit provided within the framework of the invention with at least one A-support and at least one compartment rack allows insulating glass blanks of a production lot to be sealed without time-consuming repositioning work of the sealing station and the various production lots then to be merged into order lots. In this case, as mentioned, it is provided that at least one A-support that is provided in the intermediate storage unit and that is intended for insulating glass has the "normal" widths of spacers; conversely, the at least one compartment rack provided in the intermediate storage unit for insulating glass with rarely-occurring widths of spacers is determined.

In particular, the method according to the invention and the device according to the invention are designed for the sealing of insulating glass blanks with a single nozzle, which travels the entire periphery of the insulating glass blank during sealing (achieved in particular only by the sealing nozzle moving along the periphery of the insulating glass blank), whereby the one sealing nozzle is mounted on a slot that for its part is mounted to move up and down on a beam that can move horizontally in the sealing station in a plane that is parallel to the insulating glass blank.

In one embodiment, the method according to the invention can be distinguished in that during sealing, the insulating glass blank is held in the area of its upper edge by a beam that is fitted with rollers.

In one embodiment, the method according to the invention can be distinguished in that the insulating glass blank is held in the area of its lower edge during sealing by suction devices that are loaded with underpressure.

In one embodiment, the method according to the invention can be distinguished in that during sealing, the insulating glass blank is held in the area of its lower edge by gripper assemblies clamping on the insulating glass blank.

In one embodiment, the method according to the invention can be distinguished in that the grippers of the gripper assemblies engage the glass pane of the insulating glass blank resting on the latter from below.

In one embodiment, the method according to the invention can be distinguished in that the grippers of the gripper assembly engage glass panes of the insulating glass blank only in the area of the outer edges of the edge of the glass panes.

In one embodiment, the method according to the invention can be distinguished in that during sealing, the insulating glass blank is stationary in the sealing station and only the sealing nozzle is moved.

In one embodiment, the method according to the invention can be distinguished in that the sealed insulating glass blank is removed from the sealing station in the direction away from the sealing nozzle.

In one embodiment, the method according to the invention can be distinguished in that grippers of the gripper assembly are removed, in particular lowered, from the lower edge of the insulating glass blank, while the sealing nozzle is moved through the area in which grippers are arranged.

A method for temporarily storing sealed insulating glass can be distinguished according to the invention in that insulating glass is stored in an intermediate storage unit, sorted according to production lots.

In one embodiment, the method for temporary storage according to the invention can be distinguished in that insulating glass is removed from the intermediate storage unit, sorted according to order lots.

In one embodiment, the method for temporary storage according to the invention can be distinguished in that insulating glass is temporarily stored with uniformly wide spacers in an area of the intermediate storage unit, in particular at least one A-bearing support, and in that insulating glass is temporarily stored with spacers whose widths deviate from usual widths in a second area of the intermediate storage unit, in particular in at least one compartment rack.

A device for carrying out the method according to the invention for sealing can be distinguished in that in the sealing station, a sealing assembly that can move up and down essentially vertically on a guide beam is provided with at least one sealing nozzle, in that the guide beam can move horizontally, and in that supporting and holding systems engaging only in the area of the lower edge and in the area of the upper edge of an insulating glass blank are provided for holding an insulating glass blank in the sealing station.

In one embodiment, the device can be distinguished in that the supporting or holding system engaging on the upper edge of the insulating glass blank and provided in the upper area of the sealing station is a roller beam that is fitted with rollers.

In one embodiment, the device can be distinguished in that the rollers on the beam of the roller beam are mounted to be able to freely rotate around essentially vertical shafts.

In one embodiment, the device can be distinguished in that the lower holding system is at least one gripper assembly.

In one embodiment, the device can be distinguished in that the lower holding system is a series of suction devices that are loaded with underpressure.

In one embodiment, the device can be distinguished in that the lower holding system is at least one gripper assembly.

In one embodiment, the device can be distinguished in that the lower holding system can be removed, in particular lowered, from its position assigned to the lower edge.

In one embodiment, the device can be distinguished in that the gripper assembly has at least two grippers with two gripper jaws each, which can be clamped onto the lower edge of an insulating glass blank.

In one embodiment, the device can be distinguished in that a removal robot, which is arranged on the side opposite the sealing assembly, is assigned to the sealing station.

In one embodiment, the device can be distinguished in that the removal robot has a panel of suction devices that can be loaded with underpressure.

In one embodiment, the device can be distinguished in that the removal robot can be shifted between a position assigned to the sealing station and a position assigned to an intermediate storage unit.

In one embodiment, the device can be distinguished in that the removal robot can be shifted from the position assigned to the sealing station into the position assigned to the intermediate storage unit by moving along a guide rail.

In one embodiment, the device can be distinguished in that the removal robot can be pivoted around an essentially vertical shaft from the position that is assigned to the sealing station into the position that is assigned to the intermediate storage unit.

In one embodiment, the device can be distinguished in that the panel of the removal robot that is fitted with suction devices is arranged on a slot via an arm that can be bent around several shafts, which slot can be moved on a horizontal guide rail.

In one embodiment, the device can be distinguished in that the removal robot is mounted to pivot around an essentially vertical shaft on a tower via an arm that can be bent around several shafts.

An intermediate storage unit that is suitable for carrying out the method for temporarily storing sealed insulating glass can be distinguished according to the invention by two groups of storage units for sealed insulating glass.

In one embodiment, the intermediate storage unit according to the invention can be distinguished in that a part of the intermediate storage unit has A-bearing supports.

In one embodiment, the intermediate storage unit according to the invention is distinguished in that another part of the intermediate storage unit has compartment racks or compartment frames.

In one embodiment, the intermediate storage unit according to the invention can be distinguished in that the support elements of the compartment frame engaging insulating glass have support elements with V-shaped cut-outs.

In one embodiment, the intermediate storage unit according to the invention can be distinguished in that the compartment frames have elements for holding insulating glass that can be shifted crosswise to the plane of the compartments.

BRIEF DESCRIPTION OF THE DRAWINGS

Further details and features of the invention follow from the description below of embodiments based on the attached drawings. Here.

DETAILED DESCRIPTION OF THE PREFERRED EMBODIMENTS

Figure 1:
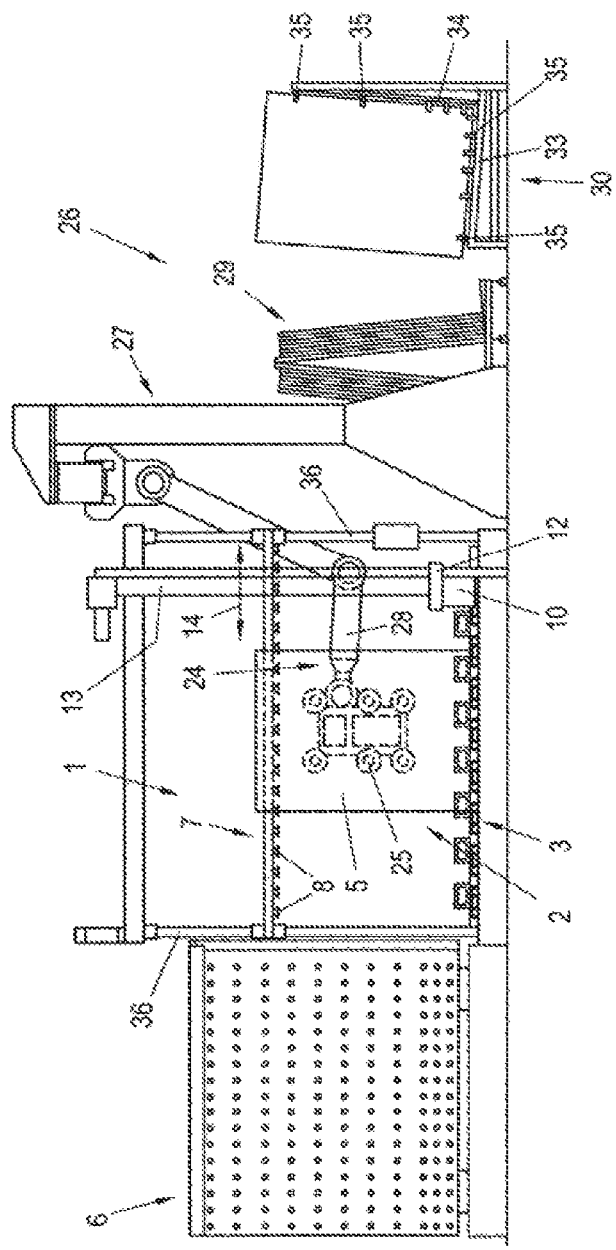
FIG. 1 shows schematically in a view a first embodiment of a device according to the invention.

In the sealing station 2 on the lower edge, the device 1 according to the invention has a series of rollers or conveyor belts 4 that serve as supply conveyors 3 for insulating glass blanks 5. Insulating glass blanks 5 are transported by means of a conveyor system 6, placed upstream from the sealing station 2, coming, for example, from a station for compiling insulating glass blanks 5, into the sealing station 2. In the sealing station 2, the upper edge of the insulating glass blank 5 is supported by a roller beam 7, which can be moved up and down in the device on two essentially vertical beams 36. To this end, a power-assisted drive that is not shown in more detail is provided. The roller beam 7 is fitted with a series of, for example pot-shaped, rollers 8, via which the roller beam 7 supports the insulating glass blank 5 by resting against the glass pane of the insulating glass blank 5 that faces it so that the upper edge of the insulating glass blank 5 is freely accessible.

Upright on the supply conveyor 3, insulating glass blanks 5 are brought into a position in which they are assigned to the sealing assembly 10 in the sealing station 1.

In the example, the sealing assembly 10 consists of a sealing nozzle 11, which is guided to be able to move up and down over a slot 12 on a guide beam 13 and can be pivoted (rotated) around a normal shaft in the plane of the insulating glass blank 5. The guide beam 13 itself can be shifted horizontally in a plane that is parallel to the insulating glass blank 5, as is indicated by arrow 14 in FIGS. 1 and 3. Thus, the sealing nozzle 11 can run all around the edge of a (stationary) insulating glass blank 5 in order to fill all (four) sections of the edge seam with sealing compound.

Within the framework of the invention, it is preferred that only the sealing assembly 10 is moved when the sealing nozzle 11 travels around the entire periphery of an insulating glass blank 5. In certain cases, in particular in the case of special shapes, a movement of the sealing assembly 10 ("sealing head") along the guide beam 13 can be combined with a movement of the guide beam 13 in the horizontal direction (arrow). Thus, special shapes of insulating glass blanks 5 (inclined and/or curved edge sections of the insulating glass blanks 5) can be sealed. However, instead of movements of the sealing nozzle 11 alone (movements of the sealing nozzle 11 up and down for the sealing of essentially vertical edges of the insulating glass blank 5 and horizontal movements of the sealing nozzle 11 for sealing the essentially horizontal edges of the insulating glass blank 5), consideration is also given to carrying out a combination of movements of the sealing nozzle 5 (essentially vertical up and down for essentially vertical edges of the insulating glass blank 5) with horizontal movements of the insulating glass blank 5 in the case of a stationary sealing nozzle 11 (for the horizontal edges of the insulating glass blank 5).

When special shapes (outlines of insulating glass blanks 5 deviating from the rectangular/square outline) are to be sealed, simultaneous movements of the sealing nozzle 11 and the insulating glass blank 5 can also be carried out.

The invention is not limited to "one-nozzle" devices. Rather, sealing assemblies 10 with two sealing nozzles 11 can also be used. Nevertheless, "one-nozzle" sealing assemblies 10 are preferred.

In order to be able to carry out the sealing, in one embodiment, the insulating glass blank 5 that is transported into the sealing station 2 is acquired by suction devices 15 in the sealing station 2 on its side opposite the sealing nozzle 11, and the conveying means of the supply conveyor 3 are removed from the insulating glass blank 5, in particular the conveyor belt 4, on the lower edge of the insulating glass blank 5, in particular are retracted backwards, and optionally the roller beam 7 moves away from the area of the insulating glass blank 5 toward the top.

In an alternative embodiment that is optionally implemented, however, together with the above-mentioned suction devices 15 in order to secure the insulating glass blank 5, these supporting gripper assemblies 16 are assigned to its lower edge. The grippers 17 of the gripper assemblies 16 are assigned to the lower edge of the insulating glass blank 5 and acquire its lower edge by clamping by means of jaws 18. In this case, it can be provided that the grippers 17 and their jaws 18 or support elements have peaks or edges, so that essentially only point or line contact of the outside edge of the glass panes of the insulating glass blank 5 is provided. In particular, the jaws 18 of the grippers 17, which can be opened and closed, i.e., applied to an insulating glass blank 5, are designed in such a way that they only engage in the area of the outer edge 19 of the edge 20 of the glass panes 21 of an insulating glass blank 5 (FIGS. 5 and 6).

Figure 4:
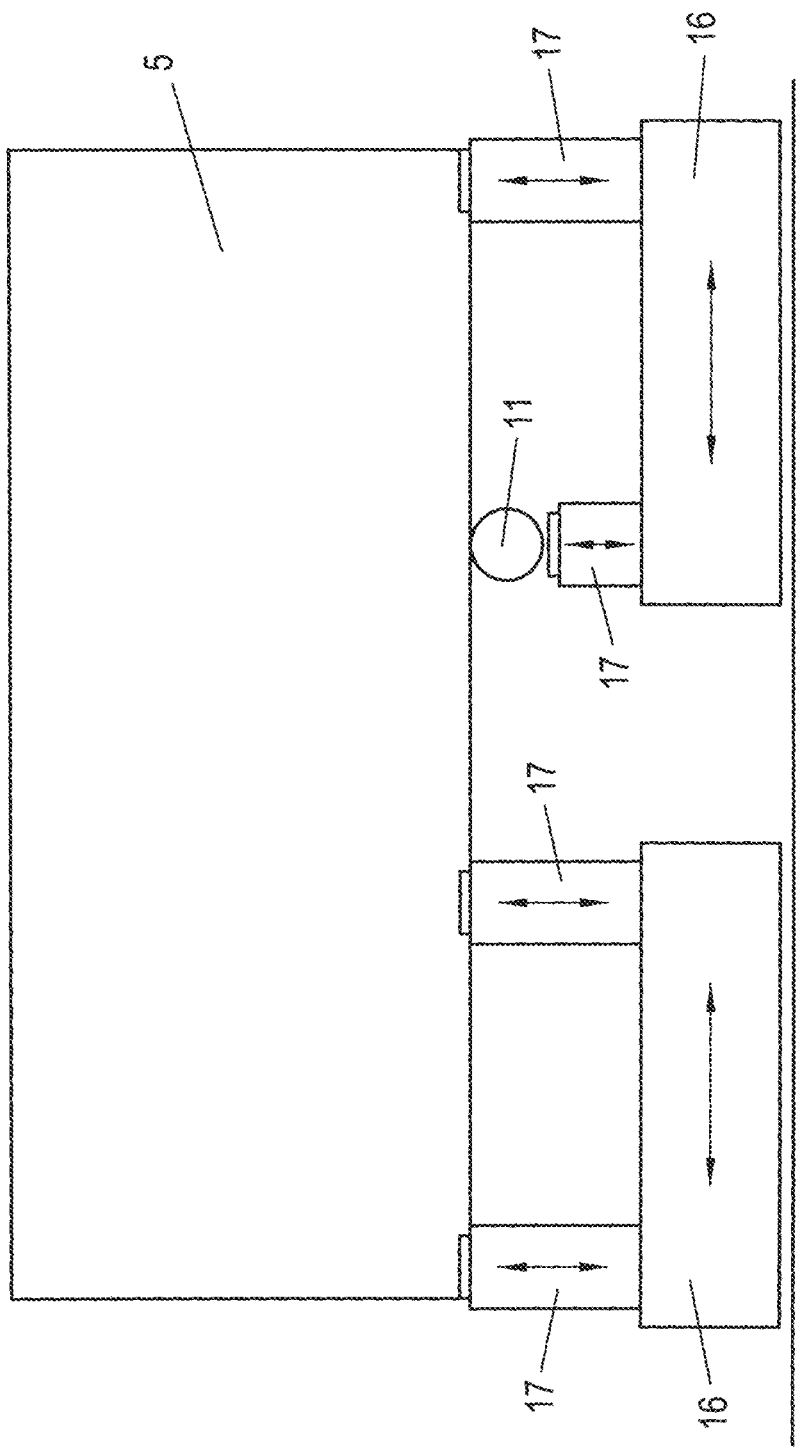
FIG. 4 shows schematically an embodiment of a gripper assembly.
Figure 5:
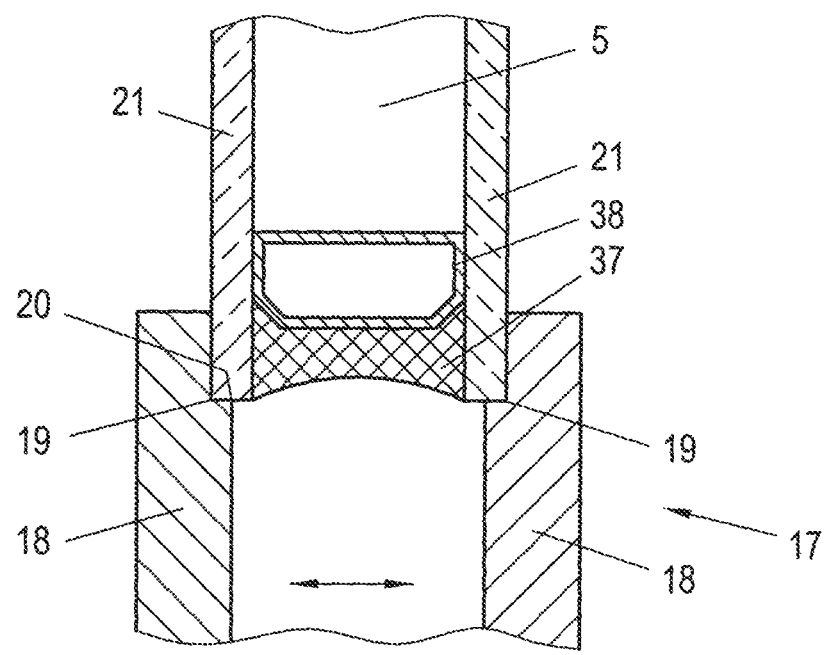
FIG. 5 shows in side view a gripper of the gripper assembly of FIG. 4.
Figure 6:
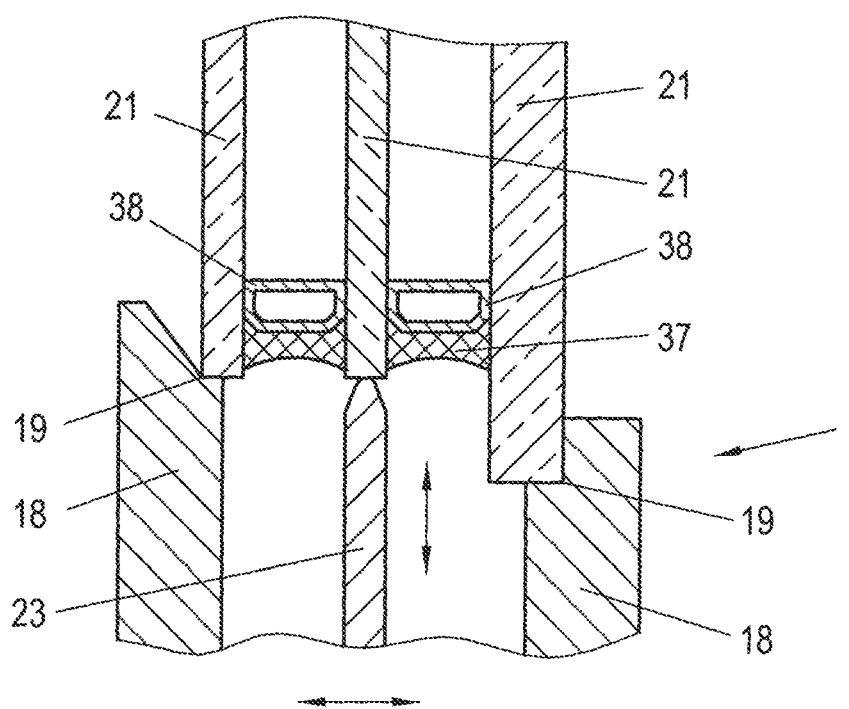
FIG. 6 shows in side view a gripper for a three-way stage element.

In the example, shown in FIGS. 4, 5 and 6, for a gripper assembly 16, two or more than two grippers 17 each are arranged on a common support 22. On its upper end, each gripper 17 carries a clamp with two jaws 18, with which the gripper 17 acquires and clamps an insulating glass blank 5 on its lower edge. Thus, after the removal of the lower supply conveyor 3, comprising a conveyor belt 4, in the sealing station 2 during sealing of the at least one gripper assembly 16, an insulating glass blank 5 that is transported into the sealing station 2 is optionally held together with the suction heads 15.

Each of the grippers 17 can be lowered from its operative position so that, as shown in FIG. 4, the grippers 17 do not prevent the movement of the sealing nozzle 11 during sealing of the lower (horizontal) edge section of the edge seam of the insulating glass blank 5. As mentioned, the movement of the nozzle 11 along the lower horizontal section of the edge seam of an insulating glass blank 5 is achieved in particular just by moving the sealing assembly 10 (movement of the guide beam 13 in the direction of the arrow 14).

When an insulating glass blank 5 that is acquired by the gripper assembly 16 and that is clamped by grippers 17 is to be moved horizontally, the latter can be produced by movement of the gripper assembly 16 or the gripper assemblies 16 when two or more than two gripper assemblies 16 are provided.

The parts (jaws 18) of the gripper 17 assigned to the lower edge of the insulating glass blank 5 are designed by, for example, peaks or cuts so that they engage the glass panes 21 of the insulating glass blank 5 only in a point or line. In this case, it is also taken into consideration that the grippers 17 only rest against one of the two or three glass panes 21 of the insulating glass blank 5 from the bottom, supporting the insulating glass blank 5. This is primarily advantageous in the case of insulating glass blanks 5 for stepped insulating glass and applies in particular for the middle support finger 23 of the embodiment of a gripper 17 of FIG. 6.

The possibility of horizontally shifting at least one gripper assembly 16 also allows the at least one gripper assembly 16 to be oriented relative to the insulating glass blank 5, for example in the area of at least one of its lower corners.

When the sealing nozzle 11 fills (seals) the edge seam in the area of the lower, horizontal edge of the insulating glass blank 5 with sealing compound, the grippers 17 are moved away one after the other, e.g., lowered toward the bottom, so that the sealing nozzle 11 can run along the lower edge of the insulating glass blank 5. This is shown (schematically depicted) in FIG. 4 for a sealing nozzle 11.

As soon as all edge seam sections of the insulating glass blank 5 have been filled (sealed) with sealing compound, the insulating glass is moved by the removal robot 24, which is fitted with suction devices 25, to an intermediate storage unit 26. In this intermediate storage unit 26, insulating glass is deposited, for example sorted according to production lots, and can be removed from the intermediate storage unit 26 sorted according to order lots.

The suction devices 15 holding an insulating glass blank 5 during sealing in the sealing station 2 can be lowered below the conveying plane of the supply conveyor 3, so that a sealed insulating glass blank 5 can be easily removed toward the rear by the removal robot 24.

Also, the conveying means of the supply conveyor 3, e.g., the rollers or conveyor belts 4 on which an insulating glass blank 5 is conveyed into the sealing station 2 in an upright manner, can be lowered in order not to impede, on the one hand, the sealing and, on the other hand, the removal of sealed insulating glass from the sealing station 2 by means of the removal robot 24.

When an insulating glass blank 5 is sealed in finished form, the panel is first brought into position with suction devices 25 of the removal robot 24 and applied on the insulating glass. Then, the suction devices 15 and/or the gripper assembly 16 are released from the lower edge of the insulating glass and lowered, and the roller beams 7 are raised, so that the sealed insulating glass is now held only by the panel with suction devices 25 of the removal robot 24. The removal robot 24 removes sealed insulating glass toward the rear, i.e., on the side opposite the sealing assembly 10, and moves insulating glass to the intermediate storage unit 26, where it is deposited (de-stacked).

Figure 2:
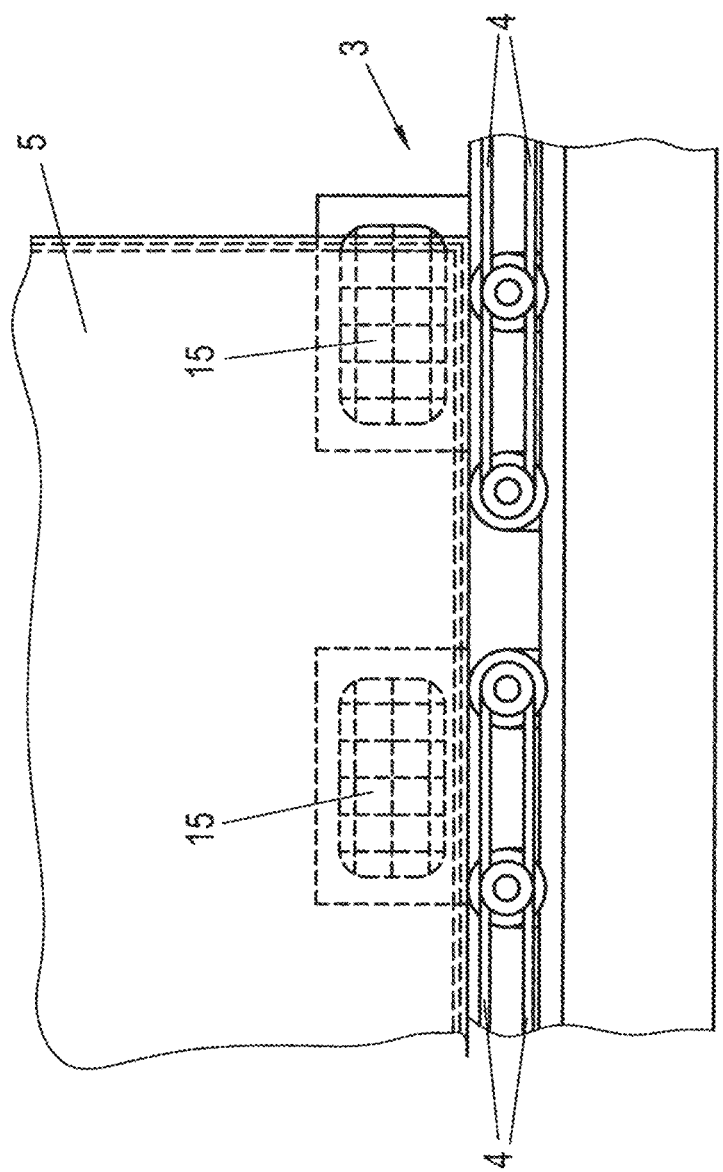
FIG. 2 shows a detail in the area of the lower edge of an insulating glass blank.

The removal robot 24 of the embodiment shown in FIG. 1 has a panel with suction devices 25, which is arranged to pivot on a tower 27 around a vertical shaft from a position assigned to the sealing station 2 into a position assigned to the intermediate storage unit 26. In this case, the panel with suction devices 25 is mounted on a tower 27 via an arm 28 having several sections that are hinged to one another. FIG. 2 also shows that the arm 28 of the removal robot 24, on which the panel with the suction devices 25 is mounted, can move around several shafts in order to be able to carry out the movements when insulating glass is removed from the sealing station 2 and when de-stacking is done in the intermediate storage unit 26 with the at least one A-bearing support 29 and the at least one compartment rack 30.

Figure 3:
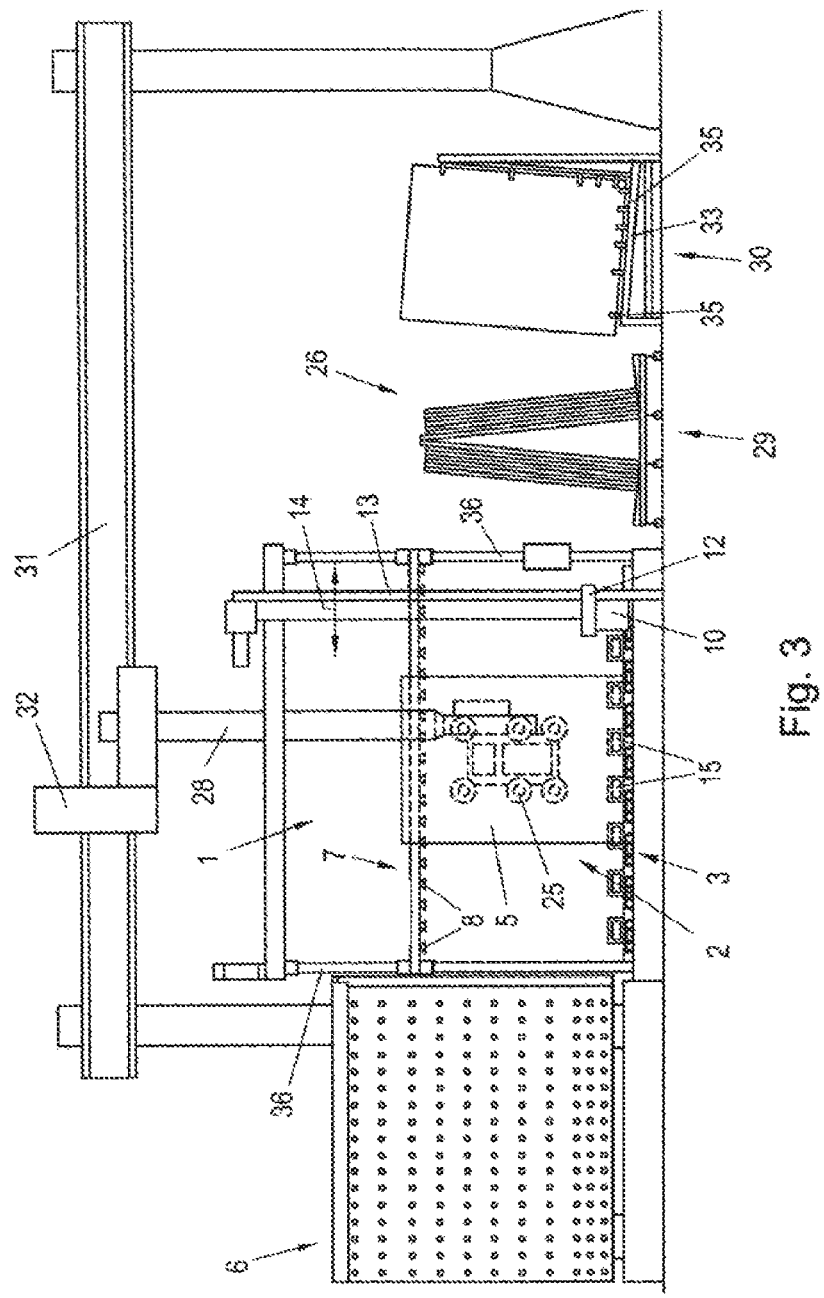
FIG. 3 shows schematically and in a view a second embodiment of a device according to the invention.

In the embodiment shown in FIG. 3, which corresponds in its basic design to the embodiment of FIGS. 1 and 2, a beam 31 is provided, on which the removal robot 24 is guided in a movable manner to remove sealed insulating glass and to move the same toward the intermediate storage unit 26. The beam 31 is oriented parallel to the conveying plane (parallel to the image plane of FIG. 2). In the embodiment of FIG. 3, the panel with the suction devices 25 of the removal robot 24 is fastened via an arm 28 to a slot 32, which can be moved along the horizontal beam 31 from a position assigned to the sealing station 2 (FIG. 3) into a position assigned to the intermediate storage unit 26. Thus, insulating glass blanks 5 (=insulating glass) that are sealed in the sealing station 2 can be removed by means of the removal robot 24 from the sealing station 2 and can be deposited ("de-stacked") in the intermediate storage unit 26.

In the embodiment that is shown, the intermediate storage unit 26 has at least one "A-bearing support" 29 and one "compartment rack" 30 each, whereby it is provided that insulating glass with spacers with common or frequently occurring widths is deposited on the at least one A-bearing support 29. Insulating glass with rarely-occurring widths of spacers is deposited in the at least one compartment rack 30. In the compartment rack 30, support elements 35, which have ends cut out in the shape of a V and which face the edge of insulating glass, are provided on arms 33, 34 that are oriented at an angle to one another, so that insulating glass in the compartment rack 30 is supported by insulating glass only by resting on the outer edges 19 of the edges 20 of the glass panes 21, and the sealing compound 37 applied outside of the spacer 38 is not touched. The possibility thus exists of placing insulating glass, sorted according to production lots, in the intermediate storage unit 26 and then removing it, compiled according to order lots, from the intermediate storage unit 26.

In summary, an embodiment of the invention can be described as follows:

During sealing, insulating glass blanks 5 are clamped from below in a sealing station 2 by grippers 17 of a gripper assembly 16 and/or by suction heads 15 and rest from above against a roller beam 7 fitted with rollers 8. When insulating glass blanks 5 are sealed, only the nozzle 11 of a sealing assembly 10 is moved along the outside edge of the insulating glass blank 5, which is stationary during sealing. When the lower edge of an insulating glass blank 5 is sealed, grippers 17 engaging the lower edge are released and moved away toward the bottom. Sealed insulating glass is removed by a removal robot 24 from the sealing station 2 on the side opposite the sealing assembly 10, moved into an intermediate storage unit 26, and deposited in the latter, sorted according to production lots, on A-bearing supports 29 and compartment frames 30.

The invention claimed is:

1. A method for sealing at least one insulating glass blank using a sealing assembly with at least one sealing nozzle, which is moved along an edge seam of the insulating glass blank, the method comprising:
    introducing sealing compound from the sealing nozzle into the edge seam, open toward the outside, of the insulating glass blank comprising a first surface and a second surface opposite the first surface,
    during sealing within a sealing station, the insulating glass blank being held only in areas of an upper edge and a lower edge thereof, the sealing nozzle being disposed on a first side of the insulating glass blank in the sealing station;
    acquiring the sealed insulating glass blank at the second surface of the insulating glass blank by a removal robot that is disposed on a second side of the insulating glass blank in the sealing station;
    releasing a first part of a supporting and holding system from the lower edge of the sealed insulating glass blank and lowering the first part of the supporting and holding system, and raising a second part of the supporting and holding system from the upper edge of the sealed insulating glass blank; and
    removing the sealed insulating glass blank held only by the removal robot from the sealing station by moving the sealed insulating glass blank in a direction from the first side to the second side of the insulating glass blank in a direction away from the sealing nozzle.

2. A device for implementing the method according to claim 1, the device comprising:
    the sealing station including the sealing assembly configured to move up and down essentially vertically on a guide beam, the sealing assembly being provided with at least one sealing nozzle, the guide beam being configured to move horizontally; and
    the supporting and holding system configured to hold the insulating glass blank in the sealing station, the supporting and holding system engaging only in the area of the lower edge and in the area of the upper edge of the insulating glass blank,
    wherein the sealing station is assigned to the removal robot, which is arranged on the side opposite to the sealing assembly and which removes the insulating glass blank from the sealing station.

3. The device according to claim 2, wherein the removal robot has a panel of suction devices configured to be supplied with underpressure.

4. The device according to claim 3, wherein the removal robot is configured to be shifted between a position assigned to the sealing station and a position assigned to an intermediate storage unit.

5. The device according to claim 4, wherein the removal robot is configured to be shifted from the position assigned to the sealing station into the position assigned to the intermediate storage unit by moving along a horizontal guide rail.

6. The device according to claim 5, wherein the panel of suction devices of the removal robot is arranged via an arm on a slot configured to be moved on the horizontal guide rail.

7. The device according to claim 4, wherein the removal robot is configured to pivot around an essentially vertical shaft from the position assigned to the sealing station into the position assigned to the intermediate storage unit.

8. The device according to claim 7, wherein the removal robot is mounted to pivot around an essentially vertical shaft on a tower via an arm configured to be bent about a plurality of axes.

* * * * *